United States Patent [19]
Rothman

[11] Patent Number: 5,485,762
[45] Date of Patent: Jan. 23, 1996

[54] ADJUSTER TO ESTABLISH AND MAINTAIN RESIDUAL TENSION IN A CABLE SYSTEM

[75] Inventor: Josh L. Rothman, Huntington Beach, Calif.

[73] Assignee: Hi-Shear Corporation, Torrance, Calif.

[21] Appl. No.: 263,510

[22] Filed: Jun. 20, 1994

[51] Int. Cl.⁶ ........................................... F16C 1/22
[52] U.S. Cl. ................... 74/501.5 R; 74/500.5; 74/501.6; 74/502.6; 188/196 B
[58] Field of Search .................. 74/500.5, 501.5 R, 74/502, 502.4, 502.6, 503; 192/111 A; 188/196 B

[56]    References Cited

U.S. PATENT DOCUMENTS

| | | | |
|---|---|---|---|
| 4,903,541 | 2/1990 | Shiota | 74/500.5 |
| 5,138,897 | 8/1992 | Beard et al. | 74/502.6 |
| 5,163,338 | 11/1992 | Sharp et al. | 74/500.5 |
| 5,178,034 | 1/1993 | Reasoner | 74/502.6 |
| 5,293,785 | 3/1994 | Lichtenberg | 74/500.5 |

*Primary Examiner*—Charles A. Marmor
*Assistant Examiner*—Chong H. Kim
*Attorney, Agent, or Firm*—Donald D. Mon

[57]    ABSTRACT

An adjuster to establish and maintain tension in a cable system including a reference body, and a ratchet member having succession of ratchet teeth each with a pass face and an abutment face. Two pawl members engage the ratchet member, both permitting passage of the ratchet member in the same direction. A flexible linkage anchored to the body and joining the pawl members multiplies the speed of one pawl versus the other along the ratchet member so as to maintain and adjust the residual tension in the cable system when the system is actuated and released.

5 Claims, 6 Drawing Sheets

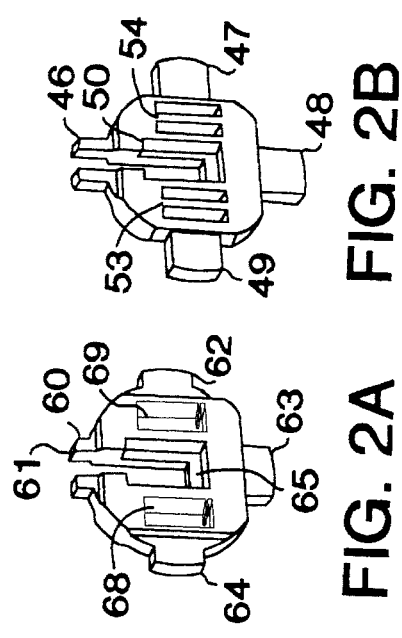
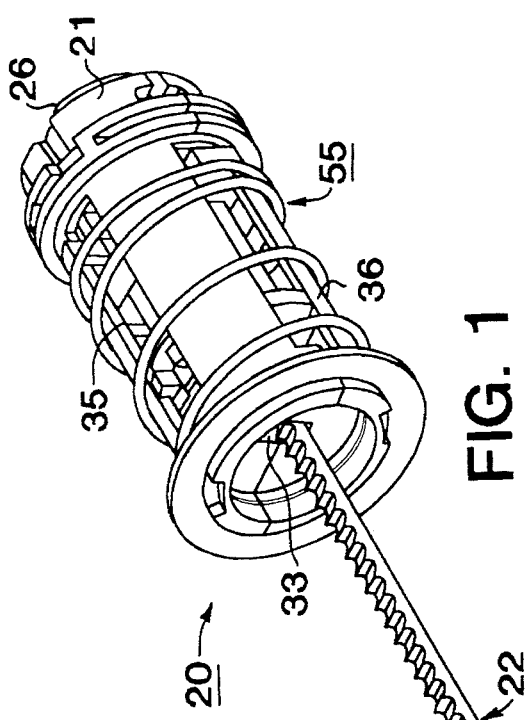
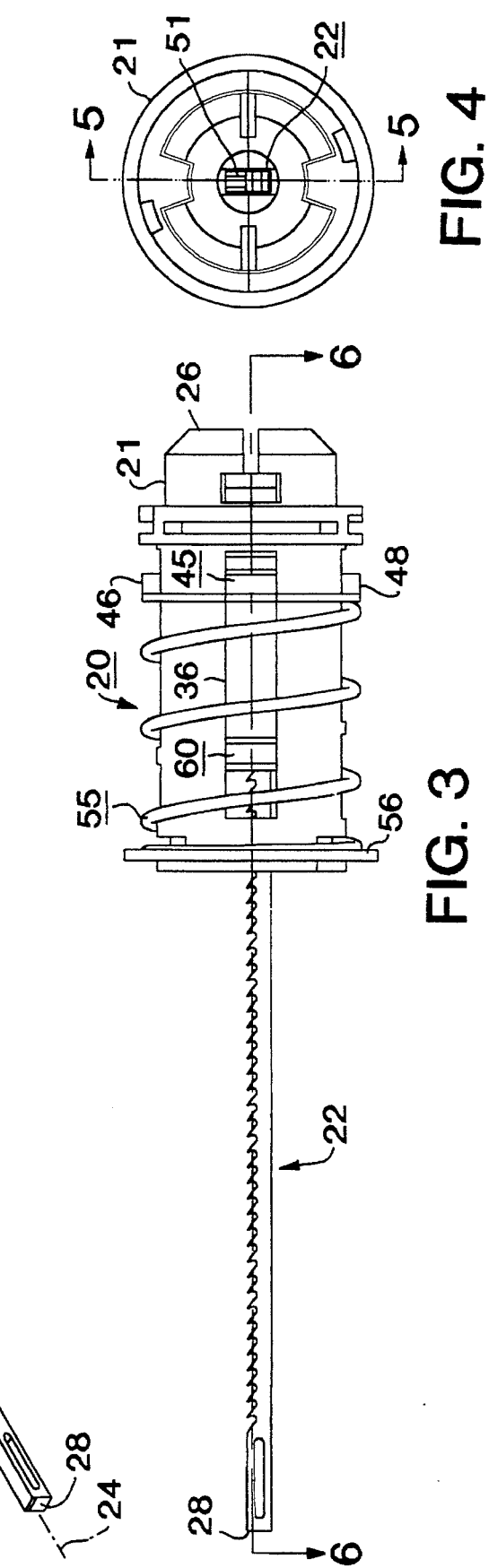

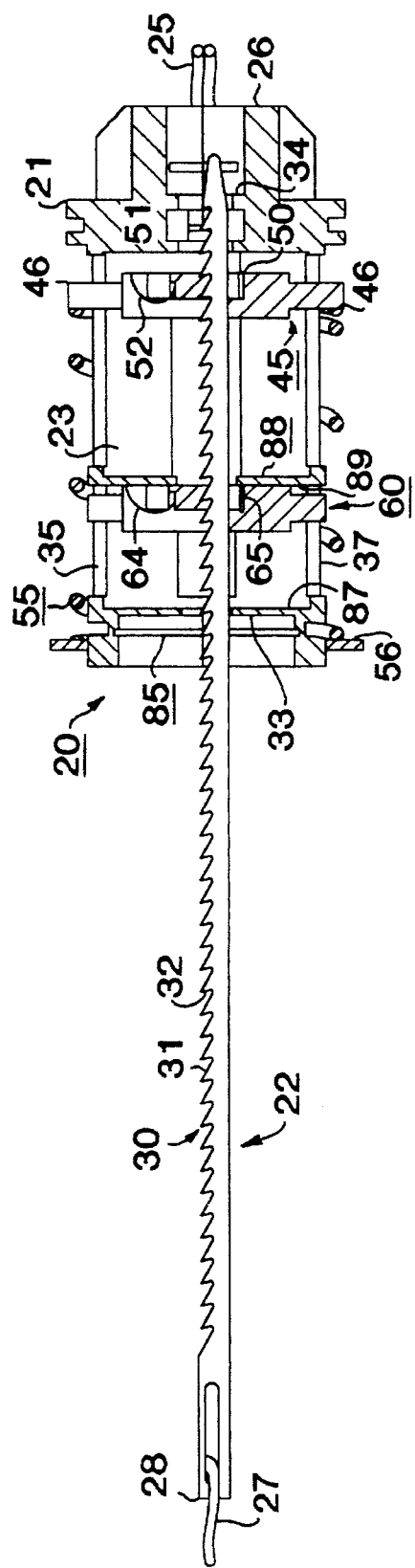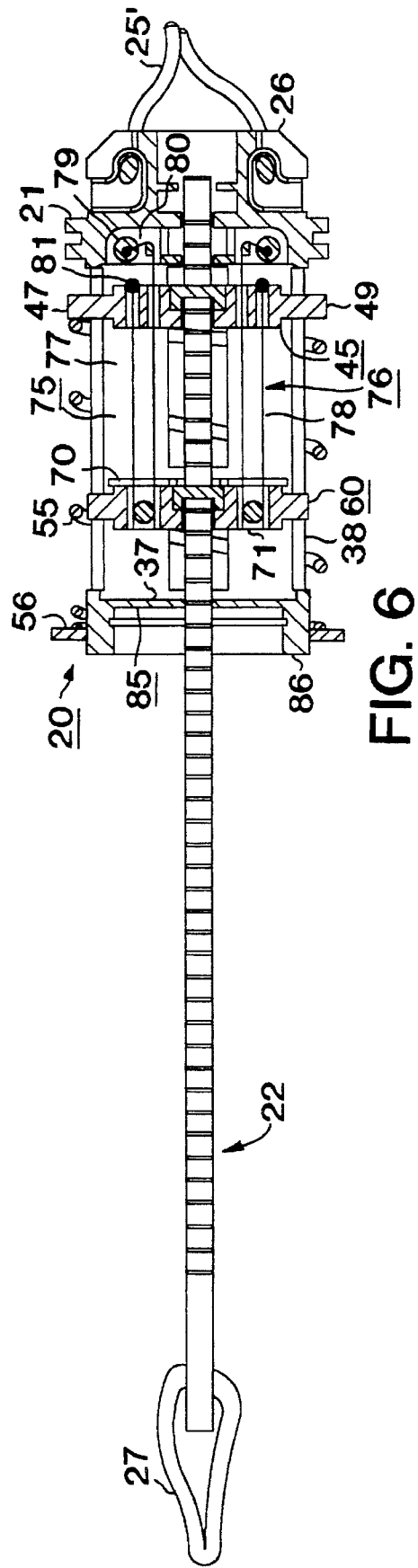

5,485,762

ADJUSTER TO ESTABLISH AND MAINTAIN RESIDUAL TENSION IN A CABLE SYSTEM

FIELD OF THE INVENTION

This invention relates to the establishment and maintenance of predetermined residual tension in a cable system, for example in brake and clutch systems, and in so doing taking up slack which would tend to reduce the residual tension.

BACKGROUND OF THE INVENTION

For a cable system to operate correctly, it must have a residual tensile preload to assure that when one end of the cable is moved, the other end will move complementarily. For example, in parking brake and in control linkages generally, a tensile pre-load is imposed on the cable.

However, over a period of time the brake lining will wear and the cable will stretch. Accordingly a pedal or lever would have to travel farther to exert its braking effect, first to account for the cable stretch, and second to catch up with the worn lining. At the same time, the residual tension in the cable is reduced.

One known means to set an initial pre-load in a cable is shown in George S. Wing U.S. Pat. No. 4,624,155. In this patent a tension limiter is placed in the cable, and a force in excess of the desired residual pre-load is applied. In the Wing patent, the limiter yields, elongating the system until the correct tension force remains. Thereafter there is no further adjustment. This is a one-time setting, which is suitable for many installations. However, it does not provide for maintenance of the residual tension, nor for the take up of cable slack.

It is an object of this invention to provide an adjuster for a tensioned cable which takes up slack that develops in the cable, and which will establish and maintain a predetermined amount of residual tension in the cable. After installation this occurs automatically as the consequence of brake actuation in brake systems, for example.

BRIEF DESCRIPTION OF THE INVENTION

An adjuster according to this invention includes a reference body and a ratchet member which are adapted to be incorporated into a force system. The force system includes at least one cable segment. A pair of pawl members engage the ratchet member in a unidirectional manner so as freely to pass the ratchet member in one direction and to drivingly engage it in the other direction.

Flexible linkage means anchored to the body joins the pawl members to each other and provides a displacement multiplying effect when the linkage means is taut which causes a first (faster) pawl member to move axially faster relative to the reference body than the second (slower) pawl member when a load is placed on the system. The faster pawl member will pass ratchet teeth while the slower ratchet member passes none. In this direction of movement the ratchet member drives the second pawl member. In the return direction the faster first pawl member drives the ratchet member but because the linkage means is flexible and will thereby be unable to function as a multiplier in this direction. A body stop limits the movement of the second pawl member under load, and a pawl stop stops it in the opposite direction.

Bias means biases the first pawl member in a direction such as to move the rachet member to draw it in a direction to shorten the net length of the adjuster. The net length of the adjuster is defined as the distance between the points of attachment of the cable ends to the body and to the ratchet member. When the second pawl member abuts the pawl stop, if the residual tension compared to the bias force is sufficient, the ratchet member is not drawn farther, and the ratchet member does not advance relative to the second pawl member. If it is insufficient, the bias means draws it past the second pawl, stepping the ratchet one or more steps to reduce the net length.

This adjuster may be provided as a linear device, using a straight ratchet member, or as a rotary device in which the ratchet member is arcuate.

The above and other features of this invention will be fully understood from the following detailed description and the accompanying drawings, in which:

BRIEF DESCRIPTION OF THE DRAWINGS

FIG. 1 is a perspective view of the presently-preferred embodiment of an adjuster according to this invention;

FIGS. 2A and 2B are perspective views of two pawl plates used in this invention;

FIG. 3 is a side view of FIG. 1;

FIG. 4 is a right hand side view of FIG. 3;

FIG. 5 is a cross-section taken at line 5—5 in FIG. 4;

FIG. 6 is a section similar to FIG. 5, taken at 90 degrees therefrom;

DETAILED DESCRIPTION OF THE INVENTION

Figure 7:
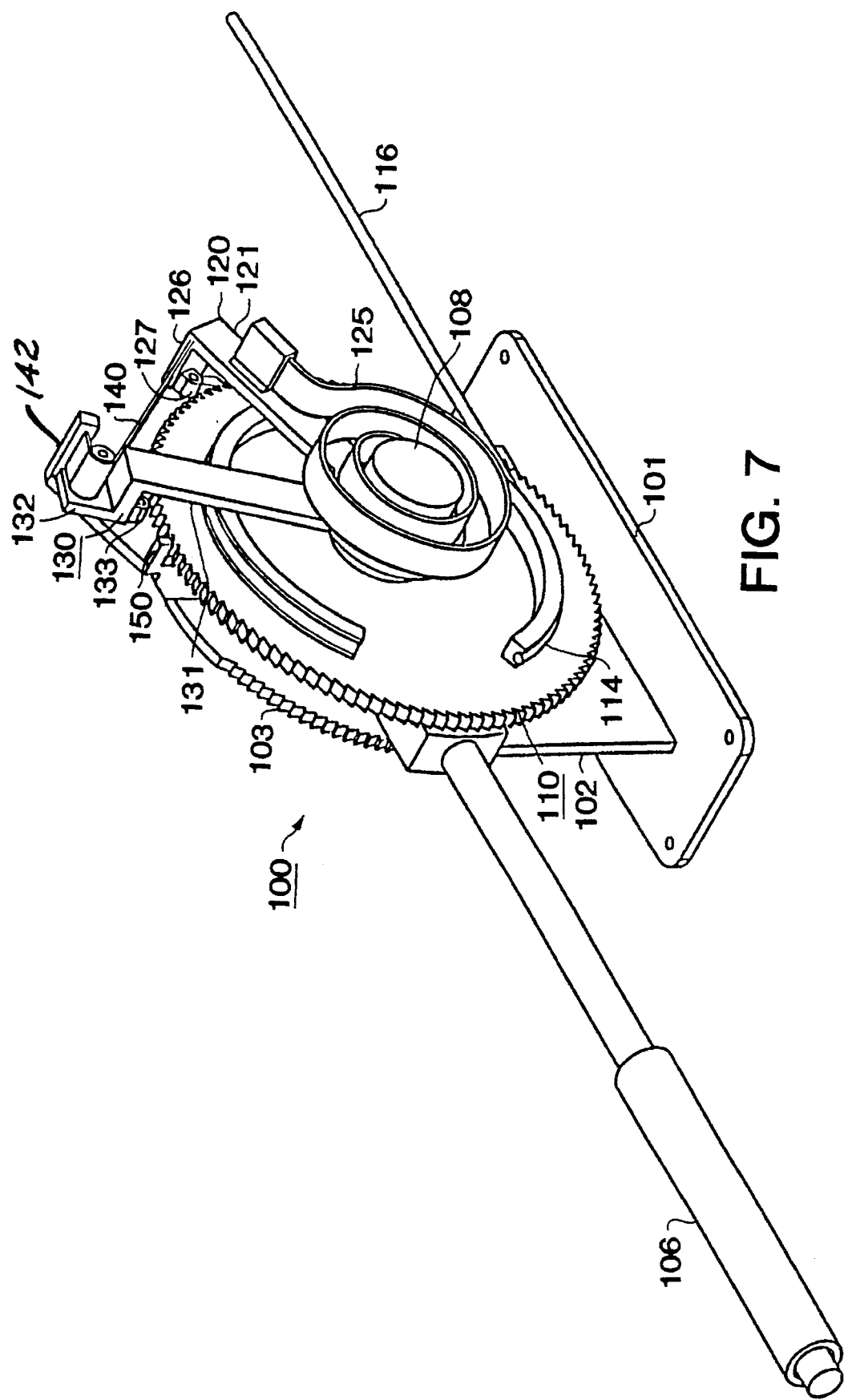
FIG. 7 is a perspective view of a rotary embodiment of the invention.
Figure 8:
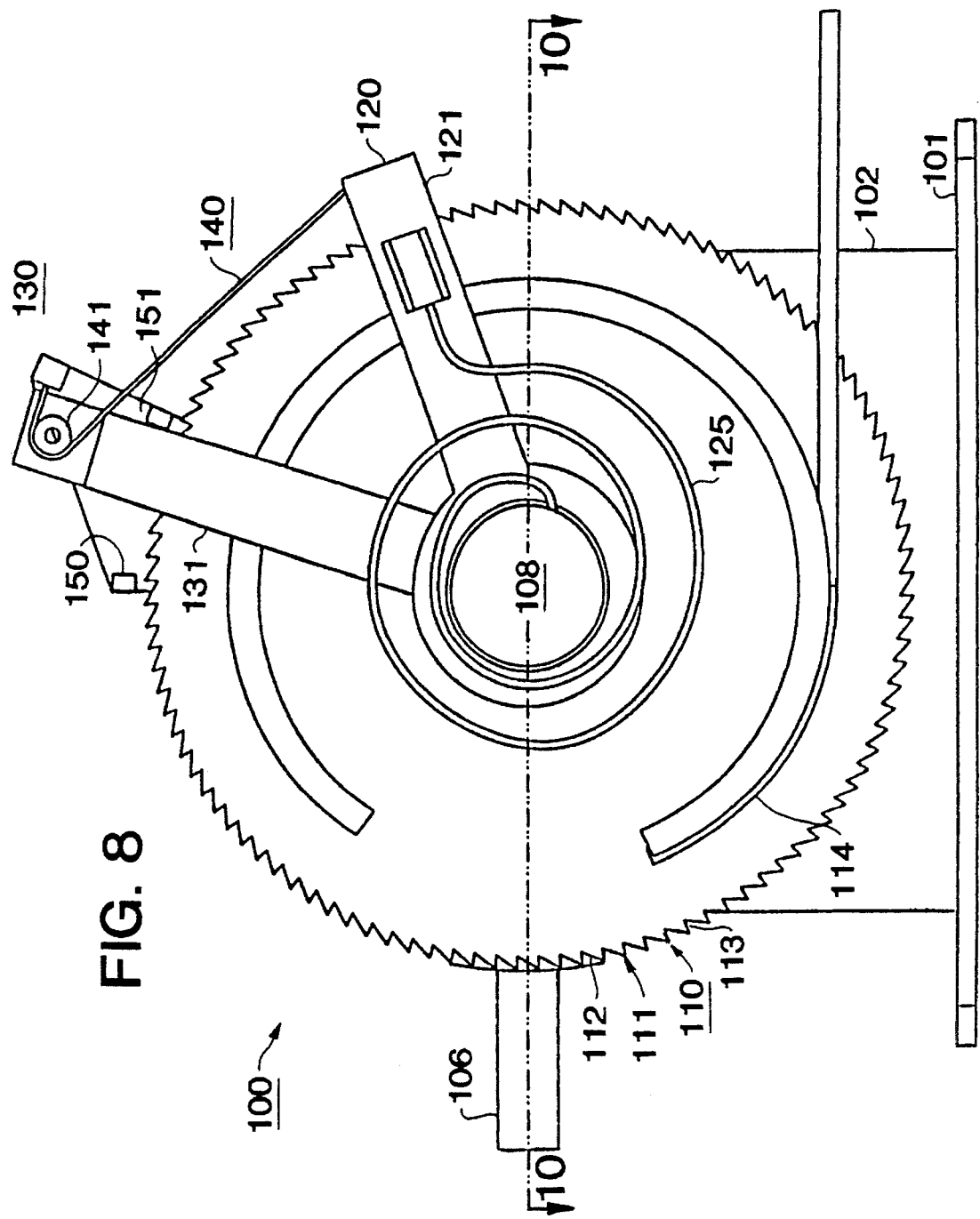
FIG. 8 is a right hand side view of FIG. 7.

The presently-preferred embodiment of an adjuster 20 according to this invention is shown in FIGS. 1–6. It includes a reference body 21 and a ratchet member 22 supported in a passage 23 in the body, open at both ends. The body has an axis 24 of actuation. The linear ratchet member moves parallel to this axis. A cable end 25 is connected to the body at a first end 26, and another cable end 27 is connected to the ratchet member at its end 28. The adjuster thereby forms a link in a cable system (not shown), one end of which may be connected to a lever or to a pedal, and the other to a mechanism which applies the brake.

It is the function of the adjuster to shorten its net length when slack occurs in the system, and to establish and maintain a predetermined residual tension in the cable when operating tension is exerted and then released.

As best shown in FIGS. 1 and 3, the adjuster can be formed in a convenient cylindrical shape which is readily fitted in a vehicle cable system. It is not anchored. With reference to FIGS. 5 and 6, ratchet member 22 is formed as an elongated rod with a series of ratchet teeth 30. Each tooth has a sloping pass face 31 and an abutment face 32. It is conveniently supported in guides 33, 34, and by pawl members to be described below.

Reference body 21 has four axially extending guide slots 35, 36, 37, 38 through its generally cylindrical center section. A first pawl member 45 (FIG. 2B), sometimes called the "fast" pawl member, includes four tabs 46, 47, 48, 49 which engage and slide in respective slots 35–38. It includes a recess 50 in which a pawl tooth 51 is slidably fitted for lateral movement relative to the ratchet member. A pawl spring 52 biases the pawl tooth toward the ratchet member. Two pairs of slots 53, 54 are provided for a purpose which will be disclosed below.

A tensioning spring 55 is fitted around the reference body, bearing in compression against a shoulder 56 on the body and against tabs 46–49, thereby biasing the first pawl member toward first end 26. This spring establishes the residual tension in the system.

A second pawl member 60, sometimes called the "slow" pawl member, is shown in FIG. 2A. It also includes four tabs 61, 62, 63, 64, which are slidably fitted in slots 35–38. It includes a recess 65 in which a pawl tooth 66 is slidably fitted for lateral movement relative to the ratchet member. A pawl spring 67 biases the pawl tooth toward the ratchet member. A pair of slots 68, 69 house respective bearings 70, 71. The tensioning spring does not contact the second pawl member.

A pair of identical linkage members 75, 76 comprise flexible inelastic belts 77, 78. Only linkage member 75 will be discussed in detail. An anchor 79 anchors one end of belt 77. The belt wraps around an optional stay 80, passes through one of the slots 53 in the fast pawl member, wraps around bearing 70 in the slow pawl member, passes through the other slot of pair 73 in the fast pawl member, and is fixed to an anchor 81 on the first pawl member.

A limit stop 85 is formed near the second end 86 of the reference body. It has a face 87 abutted by the second pawl member at one end of its movement.

A pawl stop 88 extends into the reference body. It has a face 89 in the path of the second pawl member which will be engaged by the second pawl member at the other end of its travel. It will thereby limit the travel of the second pawl member toward first end 26.

An examination of FIGS. 5 and 6 will show that slack can be taken up in the cable system, and that a minimum tension level can be maintained, as the consequence of shortening the net length of the adjuster, that is, by shortening and maintaining short the net length between its points of attachment to the cable ends. If unresisted, the ratchet member can simply be pushed through the body, shoved in one end and pulled out the other. In fact, when the device is to be installed, this feature enables it to be set with least effort. The same pertains to re-installing it. The ratchet can be attached to one cable segment and the body to the other, and the ratchet member shirred into the body until the cable is snug. One or a few actuations will approximately establish the correct residual tension in the cable.

The function in operation requires only incremental movements of the ratchet member in response to slack in the system, and the capacity to form a link in the system, which will resist and transmit actuation forces considerably greater than the desired residual tension. While a brake system is expected to be the principal user of this device, and is used as the illustrative example, it is also useful in any other system subject to respective actuation and release in which elimination of slack and maintenance of residual tension are needed. Therefore, this invention is not limited to cable systems for brakes.

As an observation preliminary to a detailed description of operation, notice that a one-unit movement of second pawl member 60 will result in a multiplying effect on first pawl member 45, moving it by two units of axial movement compared to movement of the second pawl member, both relative to the body. This is because of the multiplying effect of the belts, wrapped around the bearings in the second pawl member.

As another basic observation, limit stop 85 will limit the permissible travel of the second pawl member toward second end 86. Thus, when a braking force is applied which will move the second pawl member against the limit stop, braking force in the system is applied from the ratchet member through the second pawl member and the limit stop to the body, completing the force path to the other cable end.

Also notice that pawl stop 88 will limit the travel of the second pawl member toward first end 26. Thus if there is sufficient slack in the system, the second pawl member will pass the ratchet teeth to shorten the net length. As will be seen, this movement will be driven by the first pawl member and the tensioning spring.

Another fundamental observation is that both sets of pawl members face the same direction, however the slow second pawl member 60 is driven by the ratchet member as it moves toward end 86 when braking tension is applied. At that time, first pawl member 45 is not being driven. Instead, because of its faster speed, it passes a ratchet tooth. On the return stroke, when actuating force is released, faster pawl member engages and drives the ratchet member toward first end 26, and depending on the conditions at the time, the slow second pawl member 60 will pass a tooth. The device is thereby an "inchworm" type in which the driving effect is transferred from the second pawl member to the first pawl member when slack is to be taken up. Whether this transfer occurs or not depends on the relationships of actual residual tension in the cable system compared to a desired tension as defined by the tensioning spring.

Attention is called to conditions in the tensioning member the flexible inelastic belts which interconnect the two pawl members. The tensioning spring bears against the tabs on the first pawl member, and biases it toward first end 26. The pawls of the first pawl member engage the ratchet member and bias it toward the first end. The pawls of the second pawl member pass the ratchet member in this condition.

When the brake force or other actuating force is applied, the tension in the system increases markedly. For example, in brake systems the residual tension will often be about 20 pounds, and the actuating tension about 500 pounds. Under these circumstances the ratchet member will be pulled toward second end 86, and this movement will continue so long as the actuating tension exceeds the residual tension and until the second (slower) pawl member 60 abuts the limit stop. During this movement the net length will increase. After the second pawl abuts the limit stop, the force system is through the ratchet member, the second pawl member, the limit stop, and the reference body and the net length will not increase.

The flexible tensioning member during this time will have been taut. While the second pawl member moved one unit (or tooth) relative to the body because of the multiplying effect, the first faster pawl member will have moved two units, again relative to the body. Thus, as the second pawl moved it was driven by the ratchet member. However, the first pawl member was not being driven. Instead it was passing over one or more of the ratchet teeth. While the second pawl member stayed with the tooth which drove it, the first pawl member passed to the next tooth. This provides the opportunity to reduce the net length.

The question now is whether and how it should or will be reduced, and this is determined when the load is released. If there is slack or too little residual tension the net length will be reduced.

Note that at the extreme movement toward end 86, the tensioning belts are taut. Now assume that the tension is released. The first pawl will now be the driver, because it is loaded by the tensioning spring. It will move the ratchet member toward end 26. This will carry the second pawl with it.

Should the residual tension be correct, the second pawl will just reach the pawl stop. Should the residual tension be too low compared to the tensioning spring force, the first pawl member will continue to drive the ratchet means toward first end 26. The second pawl member, being stopped by the pawl stop, will pass one or more teeth, thereby reducing the net length. The slack in belts 77 permit this independent operation. The belts again become taut when the first pawl member returns to the repose condition shown in FIGS. 1 and 3.

It is reduction of the net length by one pitch or more of the ratchet teeth that results in the above-described take-up of slack and maintenance of tensile preload, and this is done when the axial force exerted by the tensioning spring exceeds to the existing residual tension in the cable.

From the first diagrams it is evident that the two pawl members are always at some distance apart as measured by the number of ratchet teeth between them. It is also clear that, while in operation, the distance between the two pawl members can be decreased only if the belt that joins the two is taut (thereby allowing the multiplying effect) and only if the second pawl member is traveling toward the limit stop. Conversely, the distance between the two pawl members can increase only if the belt that joins the two is slacking, the second pawl member is abutted against the pawl stop, and the first pawl member is moving in the direction of the bias force. It is precisely these two conditions that allow the device to function in an "inch-worm" like manner, whereby one pawl member moves and then the other.

The cycle of operation is as follows. Presume that the device of FIG. 1 is installed in a cable system that is slacking or that has a very low residual tension level. Under these circumstances, the components of the device would be situated as is most clearly shown in FIG. 6. The bias spring will have positioned the first pawl member at an extreme distance from the second pawl member, such distance being limited by the length of the belts. Now, if an axial force is applied to the ratchet member such that the second pawl member is drawn up to the limit stop, the distance between the two pawl members will decrease as explained above. Additional tensile force in the cable system beyond what is necessary redraw the second pawl up to the limit stop will not result in any further reduction in the distance between the two pawl members. Rather, the additional force will be transferred from the ratchet member to the second pawl member, through the body by way of the limit stop, and into the cable member on the opposite side of the device.

If the tensile load is released, the tensioning member will cause the second pawl member to move back towards the pawl stop. As this occurs, the two pawl members will move in unison with no change in distance between them. The ratchet could be cycled back and forth so that the second pawl member moves between the pawl stop and the limit stop with no resulting change in distance between the pawl members. Let us refer to this condition as the equilibrium state.

When the second pawl member abuts against the pawl stop, the bias force will be greater than the residual tension in the cable system. This is true because although the second pawl member has returned to its original position, the first pawl member has not. The decreased distance between the two pawls has resulted in the bias member having a higher force-level than it had in the original state. Because this increased bias force is greater than the residual tension in the cable system, the first pawl member will continue to move, while the second pawl member is restrained from moving by the pawl stop. In this manner, the ratchet member is drawn into the body of the device, thereby reducing the net length in the residual state and thereby eliminating slack and/or increasing the residual tension in the system.

If the cable system is actuated repeatedly, the device will repeat the cycle just described until the residual tension in the cable system has increased to the point where it is equal to the bias force. When this occurs, the first pawl member will not continue to move when the second pawl member abuts against the pawl stop because the bias force is no longer stronger than the rsidual tension in the system. It is here that the device will have reached an equilibrium state, having achieved its objective of establishing a desired level of residual tension in the cable system.

FIGS. 7–10 will be recognized as the totational analog of the linear devices of FIGS. 1–6. The device of FIG. 1 is a convenient in-line device not intended to be anchored, or to be responsive to other systems requirements.

There are interesting applications in which an anchored rotary device can provide an additional function that cannot be performed by a floating in-line device. An example is to combine it with an operating level or pedal so that actuation of the lever directly establishes and maintains the residual tension, instead of doing so through a cable segment linked to the device. FIGS. 7–10 show one such device.

Figure 9:
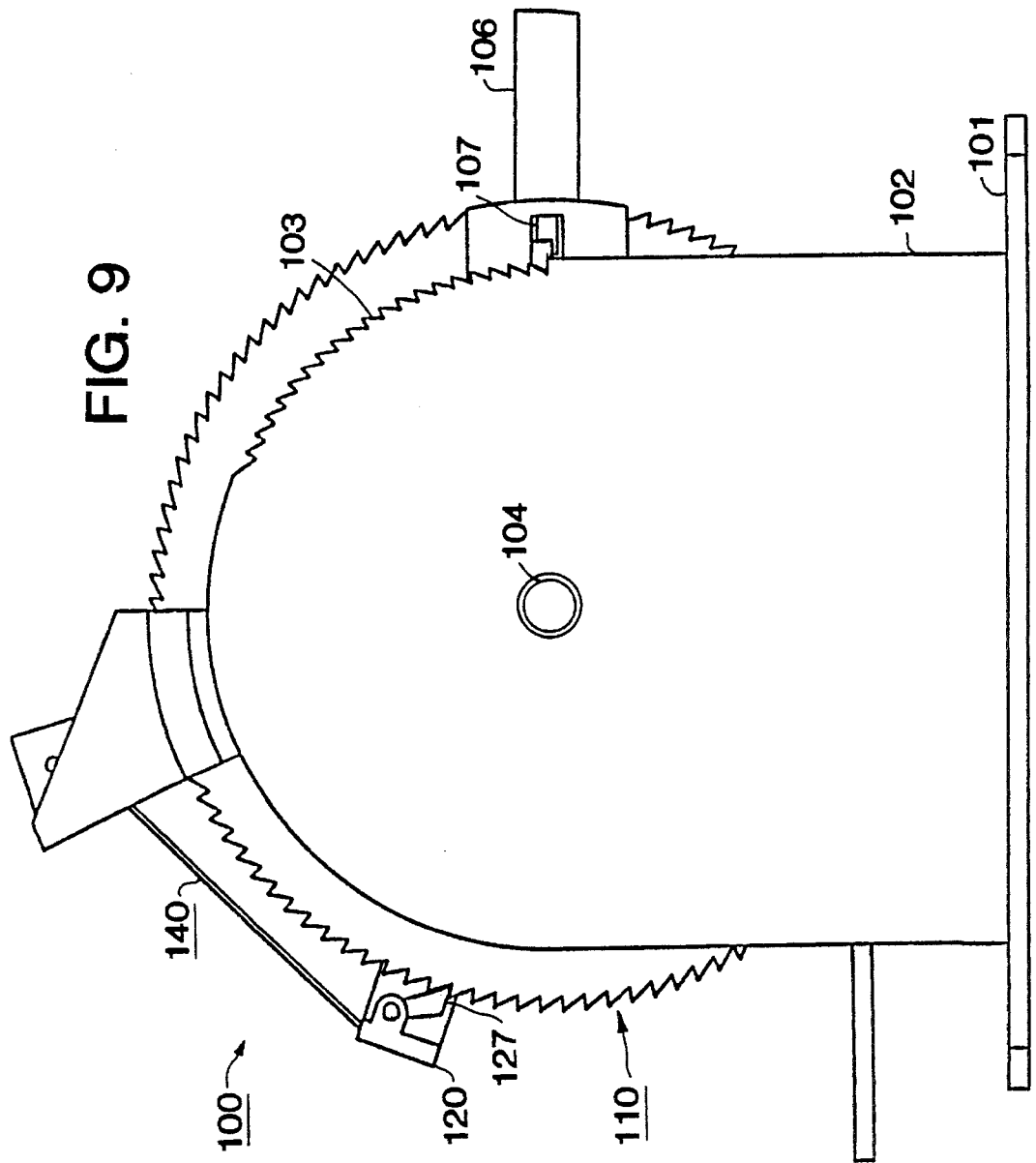
FIG. 9 is a rear view of FIG. 8.

An adjuster 100 according to the invention includes a base 101 intended to be fixed to supporting structure (not shown) such as a floor board or partition. A latch plate 102 rises from base 101. As best shown in FIG. 9 it is rigidly fixed to the base, and bears a set of latch notches 103 on an arcuate portion of its upper edge. It also includes a bearing 104 to support an actuator plate 105 with a shaft rotatably mounted in bearing 104.

A brake handle 106 projects from the actuator plate. It includes latch means 107 to engage the latch notches to hold the lever in a brake-on position. Latch means 107 can be withdrawn from the notches to enable the lever to return to an unactuated condition.

Actuator plate 105 includes a central cylindrical spindle 108 which supports a circular ratchet member 110 for free rotation around it. Ratchet member 110 includes ratchet teeth 111 with pass faces 112 and abutment faces 113.

The ratchet member is provided as a disc, with an external arcuate track 114 on one of its faces 115. Cable 116 is connected to the track 114 so that as the ratchet member is rotated, the cable is wound in or payed out, thereby reducing or increasing the net length of the device. In this embodiment the net length will be defined as the distance between the tangent point of the track with the cable and some arbitrarily-selected point on the cable spaced from the tangent.

A first (faster) pawl member 120 is formed on an arm 121 which is freely journaled on spindle 108 (FIG. 7). A tensioning member 125 comprising a coil spring is keyed to the spindle (FIG. 10), and to arm 121. A flange 126 projects over the ratchet teeth and carries a spring-loaded pawl tooth 127, as in the device of FIG. 1.

A second (slower) pawl member 130 is formed on an arm 131 which is also freely journaled on spindle 108. It carries a flange 132 with a spring-loaded pawl tooth 133, as in the device of FIG. 1. Both pawl teeth have pass and abutment faces complementary to the ratchet teeth as in FIG. 1.

A flexible inelastic linkage member 140, such as a belt, is fastened at one of its ends to arm 121 of pawl member 120. It is wrapped around bearing 141 on arm 131 of the second pawl member. Its other end is attached to an extension 142 of the actuator plate.

A limit stop 150 and a pawl stop 151 are formed on extension 142, arcuately spaced from one another, and in the path of the second pawl member, which moves relatively between them and is stopped by them.

Figure 10:
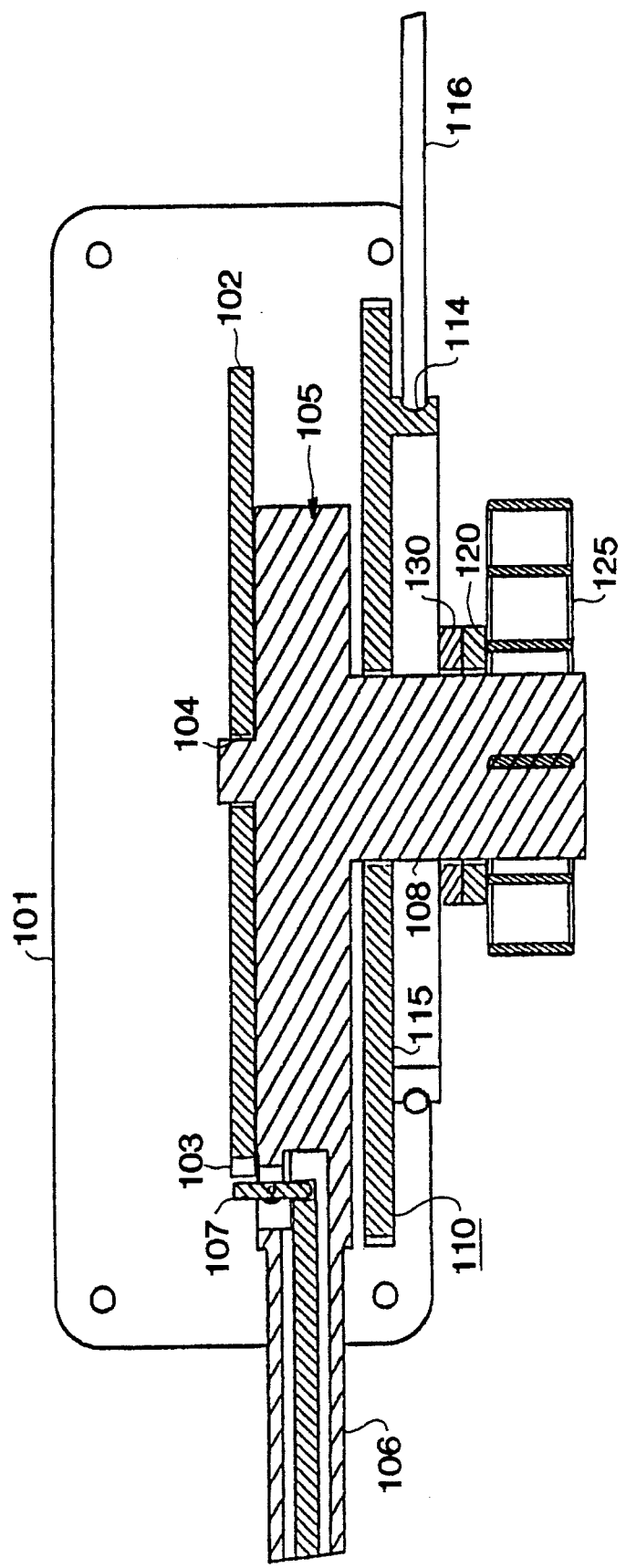
FIG. 10 is a cross-section taken at line 10—10 in FIG. 8.

Now with reference to FIGS. 7 and 10, the analogous relationships between the linear and rotational devices will be understood. The ratchet member will be biased clockwise in FIG. 10 by the coil spring. This tends to draw in the cable and increase the residual tension. The device is shown in its repose condition in FIG. 10.

It will be observed that the second pawl member moves relatively between the stops just as in FIG. 1, that the tensioning means biases the first pawl member against the abutment faces of the ratchet teeth and that release of a ratchet tooth by the second pawl member in response to a greater torque from the coil spring than from the cable segment is precisely analogous to the function of the linear spring in FIG. 1.

Further discussion of the embodiment of FIGS. 7–10 is believed to be unnecessary for its understanding.

This invention is not to be limited by the embodiments shown in the drawings and described in the description, which are given by way of example and not of limitation, but only in accordance with the scope of the appended claims.

I claim:

1. An adjuster for establishing and maintaining residual tension in a cable system comprising:

a reference body;

a ratchet member having a succession of ratchet teeth, each having a pass face and an abutment face;

a first and a second pawl member, each pawl member and having pawl teeth shaped to permit free passage of the ratchet teeth in the same one direction, and to engage them in the opposite direction;

flexible inelastic linkage means anchored to said body joining said pawl members to one another and when taut providing a multiplying effect whereby said first pawl member moves faster than the second pawl member relative to said body when said ratchet member is forced in a first direction relative to said body to increase the tension in said cable system;

a limit stop on said body limiting the movement of said second pawl in said first direction;

a pawl stop on said body limiting the movement of said second pawl member in the opposite second direction;

tensioning bias means mounted to said body and biasing said first pawl member to tend to draw said second pawl member toward said pawl stop; and said reference body and said ratchet member being adapted for incorporation into a force system which includes at least one cable segment.

2. An adjuster according to claim 1 in which said reference body has a linear axis of actuation; and in which said ratchet member is a linear body; and in which said pawl members are axially movable in said reference body; and in which said limit stop and pawl stop are axially spaced apart, with said second pawl member located between them; and in which said linkage means is anchored to said reference body, passed around a bearing on said second pawl member and anchored to said first pawl member.

3. An adjuster according to claim 2 in which said reference body is generally tubular; and in which said tensioning means is a coiled compression spring surrounding said reference body and bearing in compression between said body and said first pawl means.

4. An adjuster according to claim 3 in which said ratchet member is a rod.

5. An adjuster having an axis of rotation according to claim 1 in which said adjuster further includes:

a base including fixed latch notches;

said reference body rotatably mounted relative to said base for rotation around said axis of rotation, having latch teeth releasably engageable with said latch notches;

said ratchet member freely rotatably mounted for rotation around said axis of rotation and having ratchet teeth along a circular path, said ratchet member further having an arcuate track to which a cable segment can be mounted and along which said segment is taken in and payed out;

said first pawl member mounted to an arm freely rotatable around said axis of rotation and having at least one of said pawl teeth engageable to said ratchet teeth;

said second pawl member freely rotatable around said axis of rotation and having at least one of said pawl teeth engageable to said ratchet teeth, and a bearing;

said inelastic flexible linkage means anchored to said first pawl member and to the reference body and engaged to said second pawl member by being wrapped around said bearing;

said tensioning said means comprising a coil spring anchored to said reference body and to said first pawl means; and a lever on said reference body to rotate it around said axis, whereby simultaneously to exert actuating force by rotating said ratchet member, and to provide a releasable latch to hold said force until released, after which release the adjuster again adjusts the residual tension if necessary.

* * * * *